(12) United States Patent
Kennedy et al.

(10) Patent No.: US 7,742,397 B2
(45) Date of Patent: Jun. 22, 2010

(54) SYSTEM AND METHOD OF PROVIDING DSL SERVICES ON A TELEPHONE NETWORKS

(75) Inventors: Bryan K. Kennedy, Chamblee, GA (US); Richard Wolf, Marlton, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 156 days.

(21) Appl. No.: 12/218,505

(22) Filed: Jul. 14, 2008

(65) Prior Publication Data

US 2009/0052472 A1 Feb. 26, 2009

Related U.S. Application Data

(63) Continuation of application No. 10/725,108, filed on Dec. 1, 2003, now Pat. No. 7,409,053, which is a continuation-in-part of application No. 10/301,960, filed on Nov. 22, 2002, now Pat. No. 7,155,004.

(51) Int. Cl.
*H04L 12/66* (2006.01)

(52) U.S. Cl. ................ 370/216; 370/463; 370/493; 370/537; 379/221.01; 379/219

(58) Field of Classification Search .............. None
See application file for complete search history.

(56) References Cited

U.S. PATENT DOCUMENTS

| | | | |
|---|---|---|---|
| 4,547,034 A | 10/1985 | Forberg et al. | |
| 4,846,735 A | 7/1989 | Teichler et al. | |
| 4,871,330 A | 10/1989 | Muller et al. | |
| 5,033,974 A | 7/1991 | Biederstedt et al. | |
| 5,157,580 A | 10/1992 | Hegner et al. | |
| 5,163,855 A | 11/1992 | Gerke et al. | |
| 5,410,443 A | 4/1995 | Pelegris | |
| 5,455,856 A | 10/1995 | Story | |
| 5,494,461 A | 2/1996 | Bippus et al. | |
| 5,551,889 A | 9/1996 | Kozel et al. | |
| 5,574,614 A | 11/1996 | Busse et al. | |
| 5,641,312 A | 6/1997 | Bippus et al. | |
| 5,999,412 A | 12/1999 | Busse et al. | |
| 6,068,503 A | 5/2000 | Gerke et al. | |
| 6,144,659 A * | 11/2000 | Nye et al. | ............ 370/359 |
| 6,266,348 B1 | 7/2001 | Gross et al. | |
| 6,272,219 B1 * | 8/2001 | De Bruycker et al. | .. 379/399.01 |
| 6,371,780 B1 | 4/2002 | Aponte et al. | |

(Continued)

OTHER PUBLICATIONS

KRONE-ADSL Service Delivery, White Paper, 8 pages, Jan. 2003.*

(Continued)

*Primary Examiner*—Frank Duong
(74) *Attorney, Agent, or Firm*—Merchant & Gould P.C.

(57) ABSTRACT

A system and method for delivering digital subscriber line (DSL) service to a subscriber. In a telecommunications network, the signal passing through a protector field is diverted to a cross connect block that can be selectively configured to establish a communication route between the cross connect block and a splitter selectively receiving a DSL signal. The combined signal is then placed back upon the network by the cross connect block, which directs the combined signal back to the protector field.

12 Claims, 8 Drawing Sheets

U.S. PATENT DOCUMENTS

| | | |
|---|---|---|
| 6,426,961 B1 | 7/2002 | Nimmagadda |
| 6,470,074 B2 | 10/2002 | Teixeria |
| 6,574,309 B1 | 6/2003 | Chea, Jr. et al. |
| 6,603,850 B1 | 8/2003 | Stahl et al. |
| 6,657,966 B1 | 12/2003 | Kramarczyk et al. |
| 6,735,293 B2 | 5/2004 | Doherty et al. |
| 6,778,525 B1 | 8/2004 | Baum et al. |
| 6,785,325 B1 | 8/2004 | Liu et al. |
| 6,798,866 B1 | 9/2004 | Tennyson et al. |
| 6,826,280 B1 | 11/2004 | Sajadi et al. |
| 6,898,280 B1 | 5/2005 | Dombkowski et al. |
| 6,914,976 B2 | 7/2005 | Bloemen |
| 6,977,922 B2 | 12/2005 | Blanset et al. |
| 6,980,725 B1 | 12/2005 | Swieconek |
| 7,155,004 B1 | 12/2006 | Kennedy et al. |
| 7,409,053 B1 | 8/2008 | Kennedy et al. |
| 7,412,052 B2 | 8/2008 | Kennedy et al. |
| 2002/0111077 A1 | 8/2002 | Keenum |
| 2002/0118820 A1 | 8/2002 | Sinclair et al. |
| 2002/0168054 A1 | 11/2002 | Klos et al. |
| 2004/0042510 A1 | 3/2004 | Bremer et al. |
| 2004/0095956 A1 | 5/2004 | Henderson et al. |
| 2004/0259396 A1 | 12/2004 | Mueller et al. |

OTHER PUBLICATIONS

Methods of ADSL delivery, KRONE, 2 pages, (Publicly known at least as early as Nov. 22, 2002).

* cited by examiner

SYSTEM AND METHOD OF PROVIDING DSL SERVICES ON A TELEPHONE NETWORKS

RELATED APPLICATIONS

This application is a continuation of application Ser. No. 10/725,108, filed Dec. 1, 2003; now U.S. Pat. No. 7,409,053 which is a continuation-in-part of U.S. patent application Ser. No. 10/301,960, filed Nov. 22, 2002, now U.S. Pat. No. 7,155,004; the disclosures of which are incorporated herein by reference in their entirety.

BACKGROUND OF THE INVENTION

The present invention relates generally to digital subscriber lines, and, more specifically, to a new system and method for adding digital subscriber line service to one or more lines of a telephone network.

Digital subscriber line (DSL) technology allows for high-bandwidth networking connections to be made over ordinary copper telephone lines. Traditional phone service typically relies on unshielded twisted pair (UTP) copper lines to connect homes and small businesses to the communications network operated by the telephone company (TELCO). Every one of these networks includes a central offices (CO) that services a defined region, with each CO responsible for connecting and routing calls directed to sites that reside both internal to and external of the network Branching out from the central office are numerous remote terminals (RT) located throughout the region being served by the CO, with each RT providing the phone service for the subscribers located within a specific area or neighborhood. One of the primary components that make up a remote terminal (RT) is a pair gain system, also known as a derived carrier system, or digital loop carrier system. In simplest terms, the pair gain system provides the TELCO with the capability to carry multiple services over a lesser number of lines, for example, five conversations over one telephone line. The pair gain system also is responsible for generating the dial tone signal one hears when they first pick up a telephone handset, indicating that an active connection is present.

Figure 1:
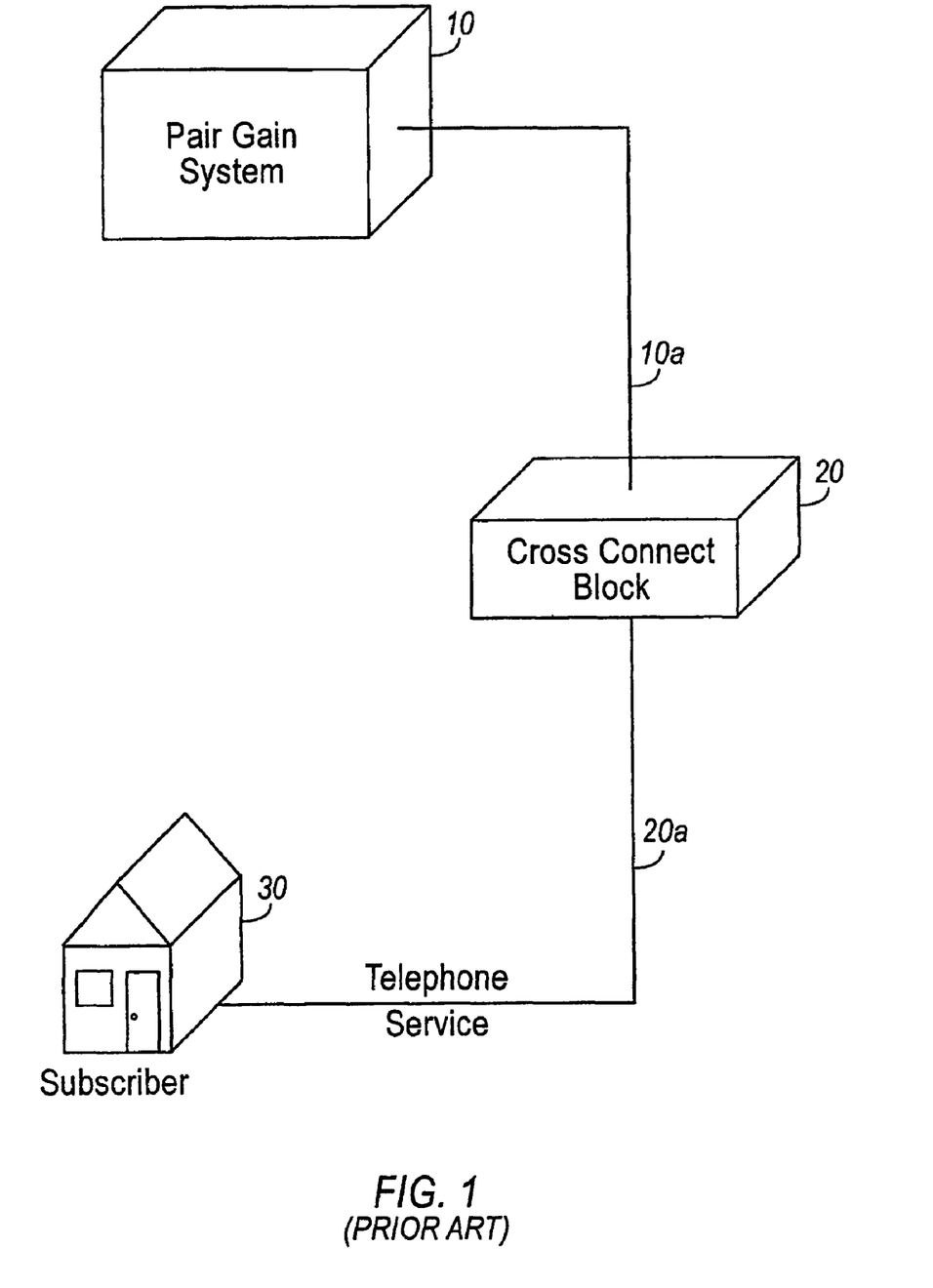
FIG. 1 is a simplified depiction of a typical neighborhood setup for distributing telephonic communication service to a subscriber.

FIG. 1 depicts a typical telephone connection between a pair gain system 10 of a remote terminal (RT) (not shown) and a subscriber 30. As indicated in FIG. 1, the connection between the pair gain system 10 and subscriber 30 is not accomplished directly, but instead in two legs. The first connection 10a exists between the pair gain system 10 and a cross connect block 20, while the second connection 20a is made between the cross connect block 20 and a subscriber 30. As indicated by its name, the purpose of the cross connect block 20 is to allow easy matching and connecting of two or more connections to one another, thereby facilitating the addition or removal of phone services to or from the subscriber.

To further illustrate the use of a cross connect block 20, consider the following example involving a typical modern day residence. New homes are often pre-wired to handle multiple telephone lines, i.e. six lines, to allow for future expansion. In this situation, there would be six connections running between the subscriber's house 30 and the cross connect box 20. However, if the subscriber only has two active phone lines, then only two connections representing the active circuits would run from the pair gain system 10 to the cross connect box 20. Later, if the subscriber wishes to add a new telephone line for a fax machine, a technician would have to run a new connection between the pair gain system 10 and the cross connect block 20, matching the new connection at the cross connect block 20 to the appropriate connection already present that runs to subscriber's house 30.

Note that each of connections 10a and 20a, along with the connections discussed below, although drawn as single lines in the figures, actually represent a cable pair, such as, for example, typical unshielded twisted pair (UTP) copper lines. For the remainder of the application, the terms "connection" and "cable pair" should be considered interchangeable. In view of this, it should be further understood that terminals for receiving these connections, such as can be found on cross connect block 20, are comprised of two conductors, with each conductor receiving one cable of the cable pair.

Figure 2:
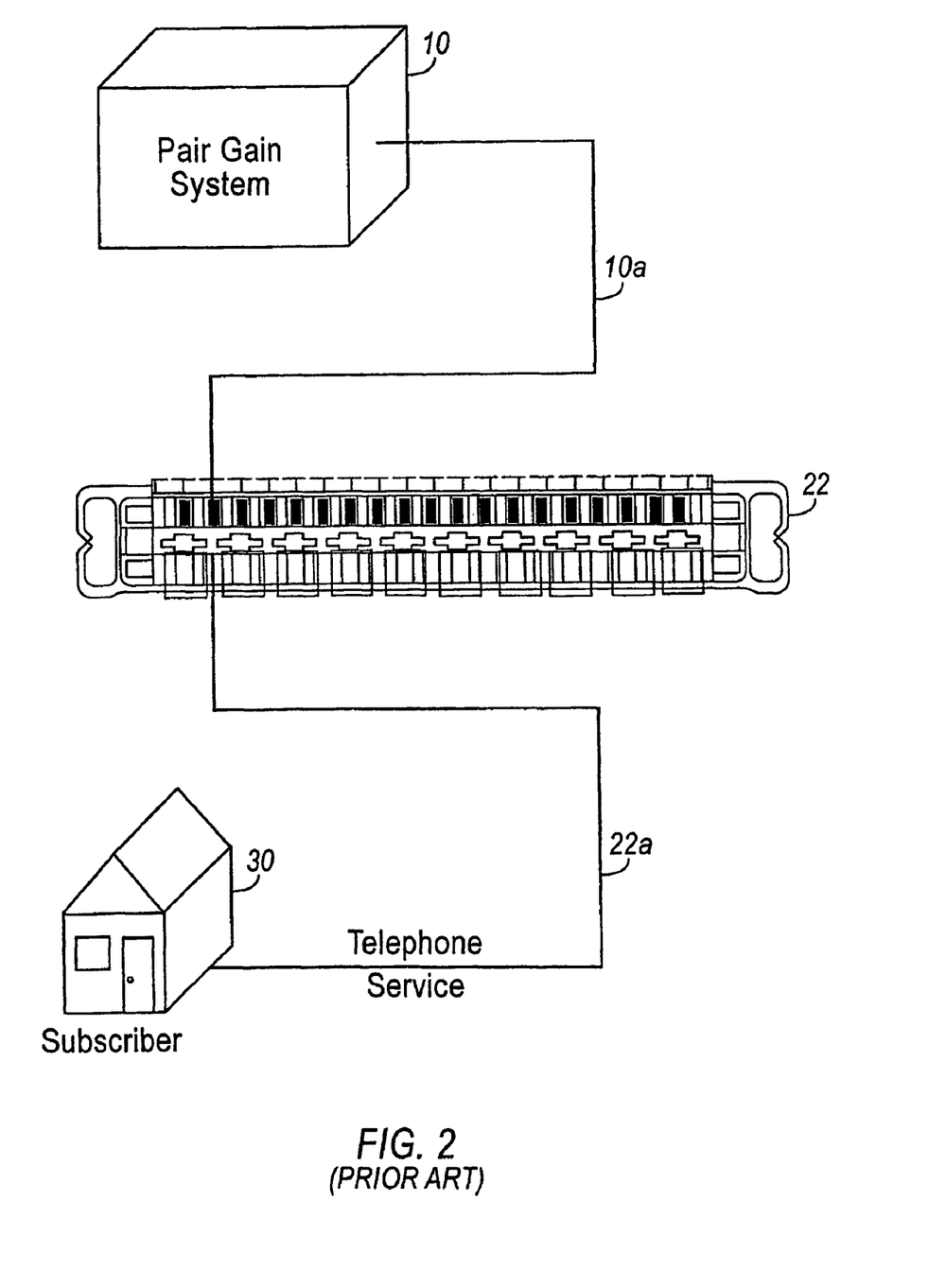
FIG. 2 is equivalent to FIG. 1, but with the cross connectivity block shown in further detail.

FIG. 2 depicts the same connection as previously depicted in FIG. 1. However, unlike the previous depiction, FIG. 2 provides a more detailed illustration of cross connect block 22, which is illustrated as an insulation-displacement connection (IDC) block. Unlike blocks that rely on screw-terminals or a wire wrapping technique to secure wires to the block, IDC blocks provide for a gas-tight connection without requiring the removal of insulation covering the wire. Connection is achieved once a wire is placed into an IDC block contact, and then punched down, typically via an insertion tool, pressing the wire against the contact to form the gas-tight connection. Due to ease of use and effectiveness, cross connect blocks utilizing IDC contacts have become the standard within the telecommunications industry.

As DSL technology is relatively new compared to typical telephonic communication involving analog signals, many of the remote terminals (RT) that are part of a telephone company's (TELCOs) network were not designed to allow easy incorporation of newer technology such as DSL. Accordingly, the TELCOs have had to develop ways to effectively provide DSL service to their subscribers utilizing the existing equipment on the network.

Figure 3:
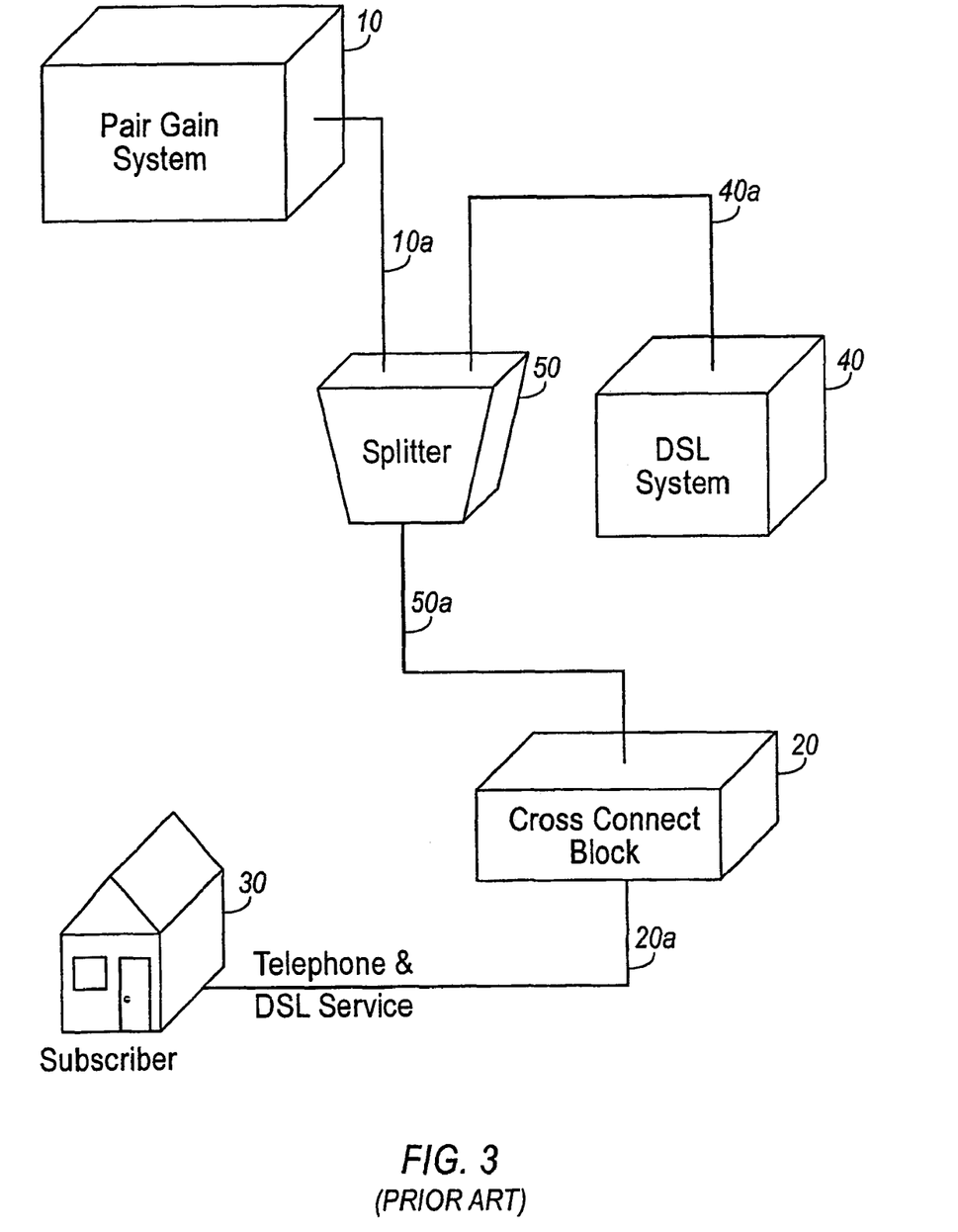
FIG. 3 is a simplified depiction of a typical setup for distributing telephonic communication service along with digital subscriber line data service to a subscriber.

FIG. 3 depicts a typical approach to incorporating DSL service with a remote terminal (RT). The dial tone or pair gain signal generated by the pair gain system 10 is directed to a splitter 50 via connection 10a. Splitter 50 also receives a connection 40a from a DSL system 40. DSL system 40 includes the equipment necessary for processing and directing the data signals back and forth between subscriber 30 and a digital subscriber line access multiplexer (DSLAM) (not shown). The DSLAM, which is operated by a service provider, takes all of the subscribers' DSL connections and aggregates them onto a single, high-density connection to the Internet. For the current illustrative example involving the integration of DSL at an RT, the DSL system may be physically mounted inside the cabinet housing the RT, or placed in its own cabinet mounted onto or next to the RT depending on factors such as size limitations and ease of access.

The role of splitter 50 is to combine the lower frequency signal from the pair gain system 10 with the higher frequency DSL data signal in such a way that they don't interfere with one another. Similarly, splitter 50 must also be capable of separating the signal sent by the subscriber 30 back into its two constituent components and then direct them back to the appropriate system. In FIG. 3, splitter 50 is depicted as an independent component separate from DSL system 40. Alternatively, splitter 50 may be incorporated into DSL system 40.

The combined signal produced by splitter 50 is delivered to cross connect block 20 over connection 50a, where it is then directed to subscriber 30 over connection 20a. Subscribers 30 can then access the higher frequency DSL signal by means of a DSL modem connected between their computing device and the telephone line(s) running throughout their residence.

At the same time, standard telephones continue to have access to the lower frequency analog signals also routed over the line(s).

To accomplish the arrangement illustrated in FIG. 3, a service technician is required to go onsite and perform wiring locally at the remote terminal (RT) that is servicing the subscriber. In order to combine the signal coming from the pair gain system 10 with the DSL data signal, the pair gain system 10 that normally is directly wired to cross connect block 20 must now be rerouted so that it interfaces with splitter 50. At splitter 50, the signal from the pair gain system 10 is combined with the DSL data signal, which also runs through splitter 50. The combined dial tone and DSL signal must then be placed back into communication with subscriber 30, requiring a new connection between splitter 50 and cross connect block 20. Due to these re-wiring requirements, the telephone service of subscriber 30 is disrupted; preventing them from making or receiving any telephone calls. Furthermore, the duration of this disruption can vary depending on the knowledge and skill of the service technician, along with the condition of the RT and the network.

If a DSL subscriber decides he or she no longer wants DSL service, the service technician must access the remote terminal (RT) again and disrupt the connection 40a that provides communication between the DSL system 40 and splitter 50. The splitter 50 must also be removed from the system, once again disrupting the subscriber's telephone service. Additionally, during the process of reconnecting pair gain system 10 back to cross connect block 20, there is always the chance that a mistake could be made, resulting in an improper connection to exist. This can lead to subscriber 30 going without telephone service for an extended duration until the problem can be corrected.

SUMMARY OF THE INVENTION

The present invention relates to a new system and method of delivering digital subscriber line (DSL) service to a subscriber. The signal passing through a protector field is diverted to a cross connect block that can be selectively configured to establish a communication route between the cross connect block and a splitter selectively receiving a DSL signal. The combined signal is then placed back upon the network by being directed back to the protector field by the cross connect block

DESCRIPTION OF THE PREFERRED EMBODIMENT

One embodiment of the present invention will now be discussed in reference to FIG. 4. Like the basic distribution setup depicted in FIG. 1, the pair gain system 10 of FIG. 4 connects to cross connect block 20 by connection 10a, while the cross connect block 20 connects to subscriber 30 by connection 20a. Through these two connections, subscriber 30 is provided with telephone service.

In order to provide DSL service to subscriber 30, a service technician accesses the cross connect block 20 that serves subscriber 30 and reroutes the telephone signal of subscriber 30 so as to combine it with a DSL signal. However, unlike prior methods of accomplishing this, according to the present embodiment the technician maintains connections 10a and 20a, thereby allowing phone service to subscriber 30 to continue during the installation of DSL service.

Instead of rewiring connection 10a, a new connection 20b is made between the cross connect block 20 and splitter 50, with connection 20b attaching to block 20 at the same terminal that receives connection 10a. This places connection 10a in communication with connection 20b so that signals traveling through one will proceed to the other. An example of a cross connect block 20 with this "double terminate" feature, where more than one connection can be established to the same terminal on the block, are the Series 2 Connecting Blocks made by Krone. A connection 40a between splitter 50 and the DSL system 40 is also established. Lastly, a connection 50a, which will carry the combined dial tone/DSL signal, is made between splitter 50 and cross connect block 20. Similar to connection 20b, connection 50a is attached to block 20 at the same terminal that attaches to connection 20a, so that these two connections are placed in communication with one another. During this entire process, the signal path made up of connection 10a, cross connect block 20 and connection 20a remains undisturbed. As such, telephone service to subscriber 30 is never disrupted.

In order to "turn on" the DSL service for subscriber 30, the service technician then modifies cross connect block 20 so as to disrupt the signal path running through block 20. As passage through the cross connect block 20 is no longer possible, the signal generated by pair gain system 10 proceeds to be redirected over connection 20b into the splitter 50, where it is combined with the DSL signal carried by 40a. The combined signal is then carried over connection 50a and connection 20a to subscriber 30, who never notices a disruption in his or her telephone service while DSL service was activated.

Figure 4:
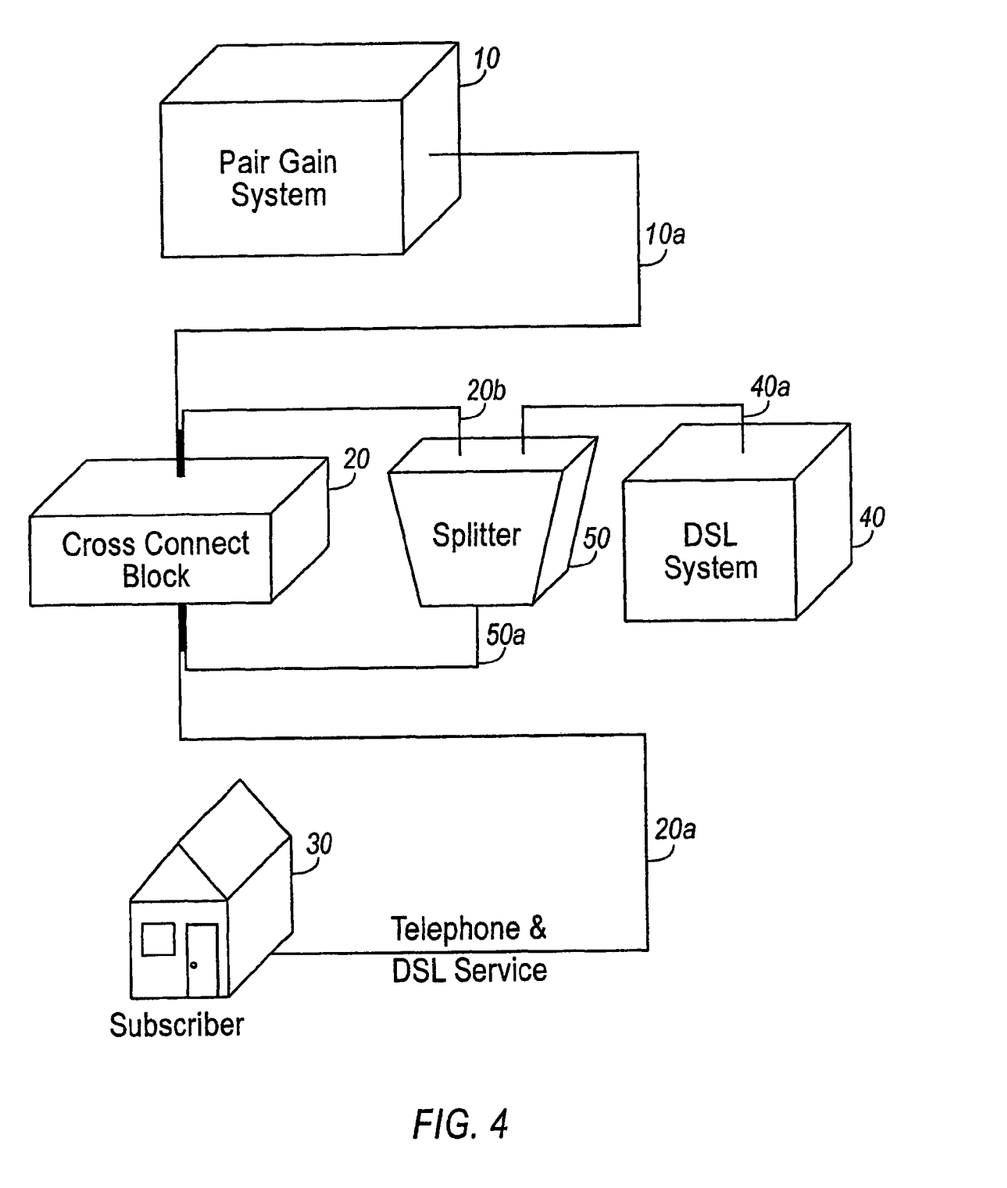
FIG. 4 is a simplified depiction of a setup in accordance with one embodiment of the present invention for distributing telephonic communication service along with digital subscriber line data service to a subscriber.
Figure 5:
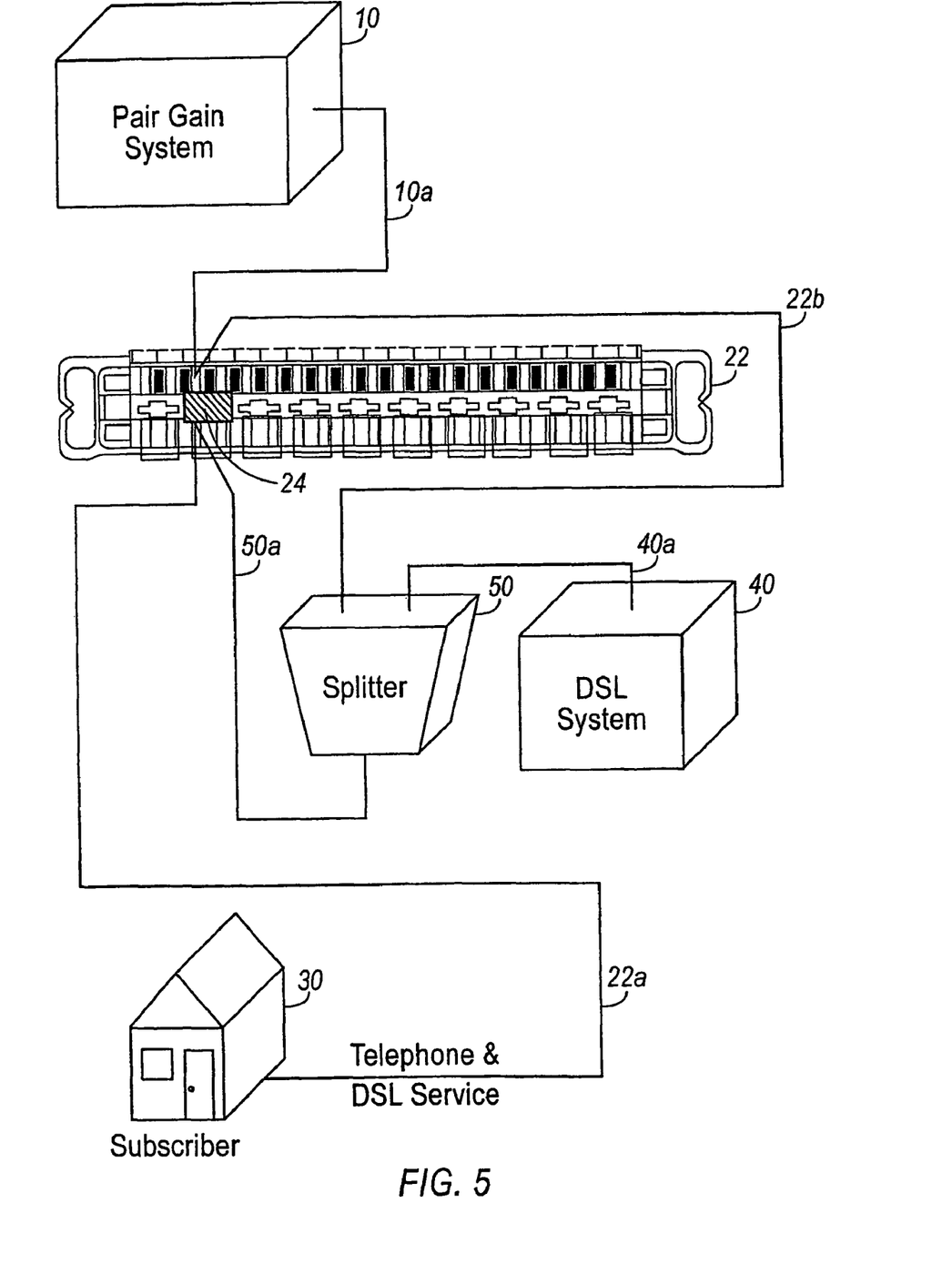
FIG. 5 is an additional simplified depiction of a setup in accordance with one embodiment of the present invention for distributing telephonic communication service along with digital subscriber line data service to a subscriber.

FIG. 5 depicts the same circuit as previously depicted in FIG. 4 with the exception that cross connect block 20 is now illustrated as an IDC cross connect block 22. As before, the service technician establishes connections 22b and 50a, which effectively adds DSL system 40 and splitter 50 in parallel to the IDC block 22. To then activate DSL service to the subscriber, the technician inserts a disconnect plug 24 designed to be received by IDC block 22. Upon its insertion, disconnect block 24 effectively disrupts or opens the signal path that previously allowed the signal from pair gain system 20 to "cut through" the cross connect block. As a result, the signal is rerouted to splitter 50 as before, thereby activating DSL service to subscriber 30 without providing any noticeable disruption in telephone service.

If subscriber 30 desires to deactivate his or her DSL service, the service technician simply repeats the process in reverse. Specifically, disconnect plug 24 is removed from IDC block 22. With plug 24 absent, the signal path through the block is once again established and the signal from pair gain system 10 takes the direct path consisting of connections 10a and 22a, instead of being redirected through splitter 50. Connections 22b and 50a can then be removed safely. As during the DSL installation stage, subscriber 30 notices no disruption in their telephone service while the DSL service is being uninstalled.

Additionally, unlike prior DSL installation methods, according to the current embodiment, connection 10a between the pair gain system 10 and IDC connect block 22 and connection 22a between IDC connect block 22 and subscriber 30 is never disrupted or removed. As a result, there is no chance of a misappropriate connection being made by the technician upon removal of DSL service, thereby significantly reducing the chances that a subscriber will have to go without telephone service due to technician error.

The DSL delivery system and method described in the above embodiments is also advantageous as it provides the technician a good opportunity to check the condition of the subscriber's line. For example, just prior to disrupting the signal path through the cross connect block by insertion of the disconnect plug, the technician can instead insert a test cord in place of the disconnect plug. This then allows the technician to "look both ways" along the line to detect signs of possible problems that could affect either telephone or DSL service.

Figure 6:
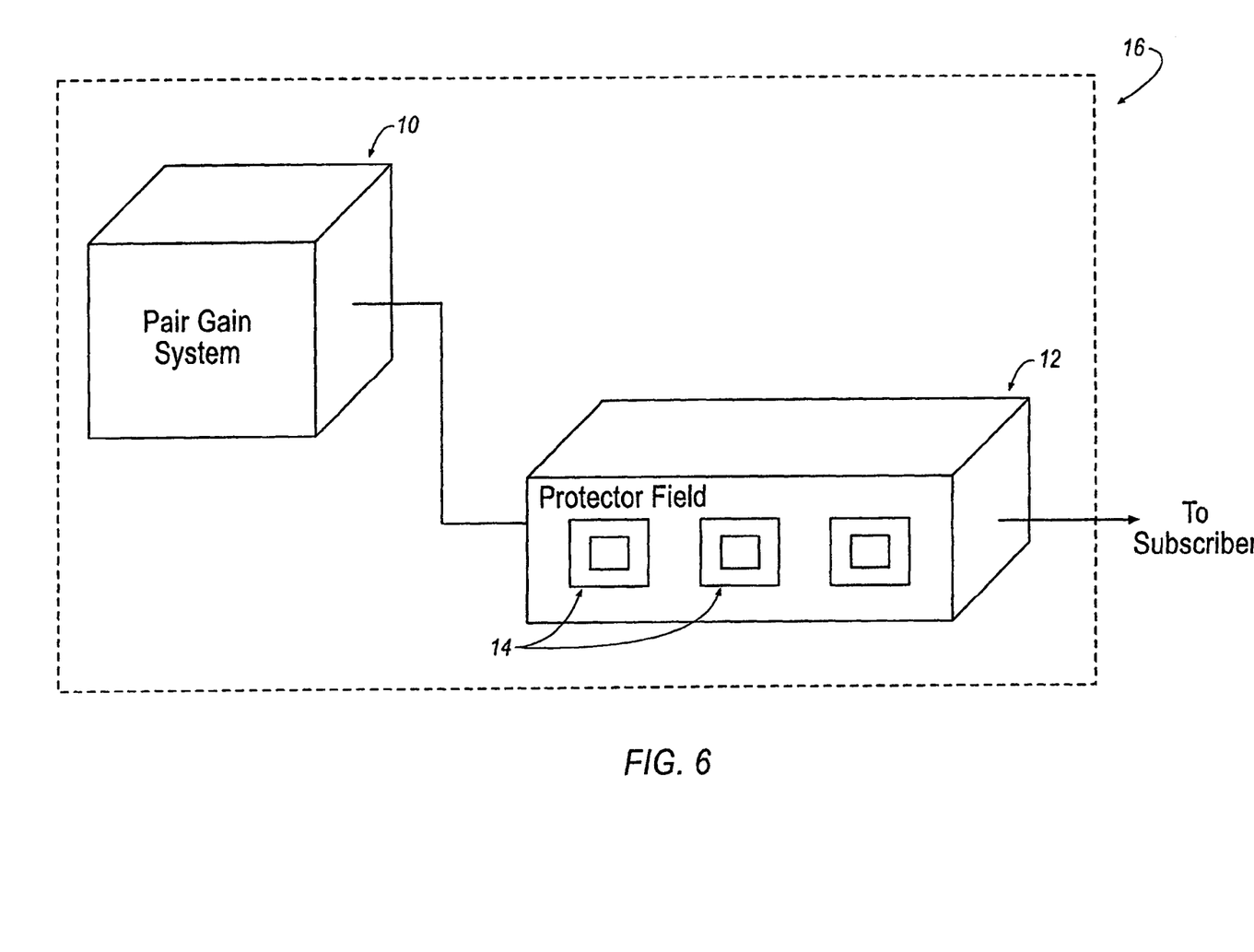
FIG. 6 is a simplified depiction of a protector field monitoring the line from a pair gain system.

In an alternative embodiment of the invention, pair gain system 10 connects to a protector block or field 12 in such a manner that all signals being delivered to, or coming from, pair gain system 10 first pass through protector field 12. One such example of a pair gain system 10 communicating with a protector field 12 is illustrated in FIG. 6. The purpose of protector field 12 is similar to that of a line conditioner or circuit breaker, protecting both personnel and equipment from abnormal voltages and currents that can be introduced to the network and which could otherwise travel along one or more connections back to the pair gain system 10 and associated equipment. Associated with each connection, or cable pair, running through the protector field 12 is a protector module 14 that traditionally plugs into the protector field 12, such as by inserting one or more conductors, projecting out from the surface of the protector module 14, into one or more corresponding receptacles built into the protector field 12. Typical network signals, represented by standard voltage and current signals traveling along a cable pair, are directed into the protector field 12, pass through an associated protector module 14 and then travel back out of the protector field 12 on to the appropriate destination. In contrast, an abnormal voltage and/or current being transmitted along a cable pair enters the protector field 12 and is subsequently reduced or eliminated by the protector module 14, which shunts the harmful voltage and/or current to ground. One or more of the protector modules 14 can also be removed from the protector field 12, thereby opening the circuits associated with the removed protector modules 14 and assuring the safety of a technician or other personnel who are physically working with the equipment.

In the example illustrated in FIG. 6, pair gain system 10 and protector field 12 are located within a controlled environment vault (CEV) 16, which traditionally is some form of low maintenance, water-tight container or enclosure that provides a permanent housing for various components of the telecommunications network, such as remote switches and pair gain and fiber transmission systems. Alternatively, pair gain system 10 and protector field 12 may be located in a central office (CO), remote terminal (RT), or any other setting where the equipment, along with the personnel working on the equipment, could be subject to harmful voltages carried along the network.

The present embodiment uses a cross connect block 20, preferably having a "double terminate" feature as discussed above, to provide for the addition of DSL service to one or more lines of a telecommunications network. According to this embodiment, however, the cross connect block 20 can be readily "spliced" into a network by means of an adapter 60 that interfaces with a protector field 12.

One example of the present embodiment will now be discussed in reference to FIG. 7. A pair gain system 10 transmits a pair gain signal over one or more cable pair lines 10b that are fed through a protector field 12 before the pair gain signal can proceed over the network to one or more subscribers. For illustrative purposes, it will be presumed for the remainder of the discussion that connections 10b and 12a represent a single cable pair delivering services to a single subscriber. However, it should be understood that these connections frequently comprise a plurality of cable pair lines providing telephony and other services to a plurality of subscribers. Traditionally, the pair gain signal transmitted through cable pair 10b enters the protector field 12 and passes through a protector module 14 associated with that specific cable pair line before being relayed out to the remainder of the network and on to a subscriber. The present embodiment of the invention alters this configuration so as to shunt the pair gain signal over to the cross connect block 20, which then provides for the selective addition of a DSL signal to the line. The above action is specifically accomplished by means of an adapter 60 that interfaces with the protector field 12.

Figure 7:
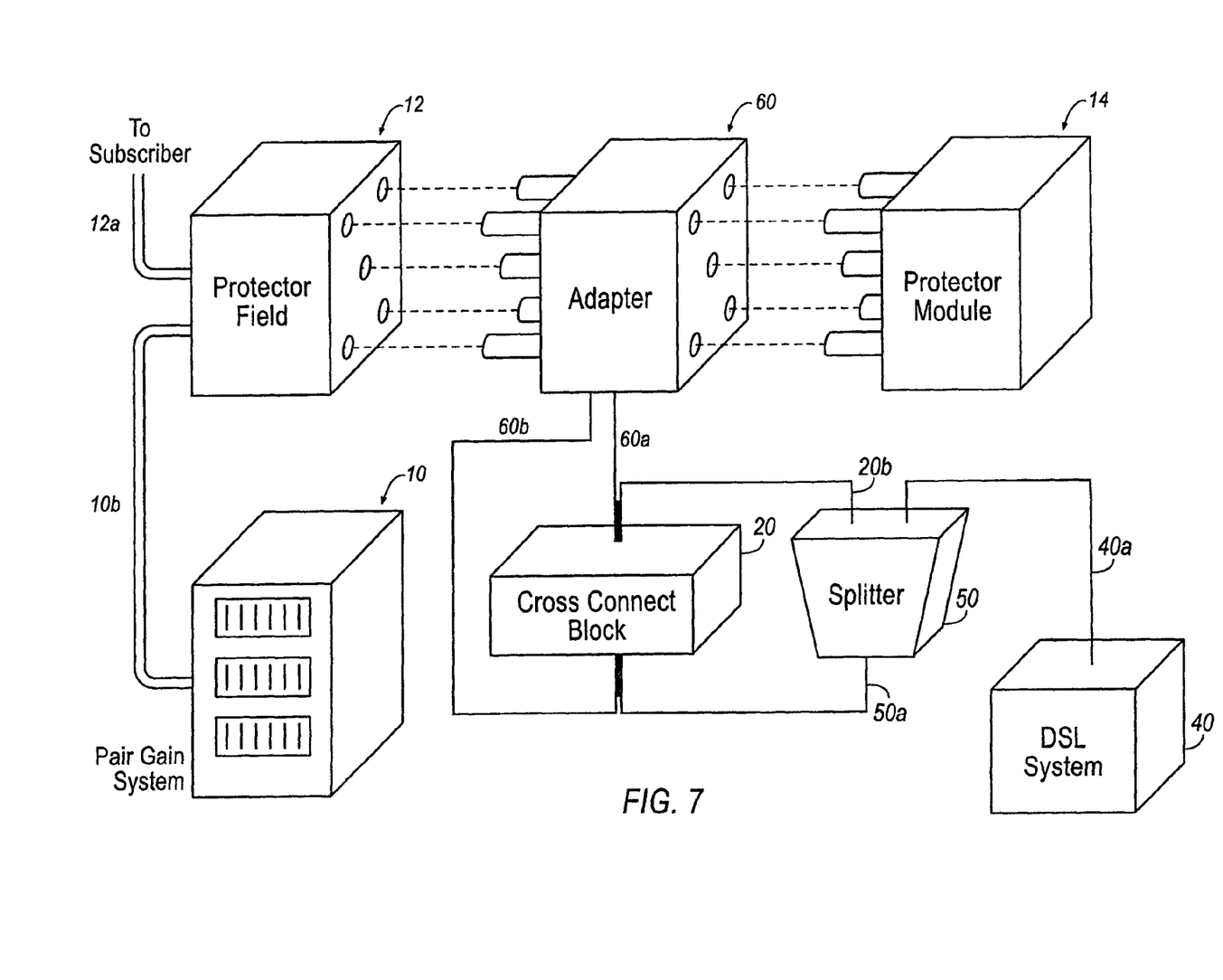
FIG. 7 is a simplified depiction of a setup in accordance with an embodiment of the present invention for distributing telephonic communication service along with digital subscriber line data service to a subscriber.

As illustrated in FIG. 7, adapter 60 is configured in a manner similar to that of protector module 14. This allows for the adapter 60 to interface with protector field 12 in the same manner as the protector module 14, such as, for example, by inserting one or more conductors, which project out from the adapter 60, into the one or more receptacles normally utilized by the protector module 14. To complete the circuit, the protector module 14 then interfaces with the adapter 60. According to the current embodiment, the adapter 60 is configured with one or more receptacles arranged in a manner similar to the receptacles of the protector field 12. This allows the protector module 14 to readily interface with the adapter 60 by inserting the conductors projecting out from the protector module 14 into the receptacles of adapter 60.

The adapter 60 electrically communicates with the cross connect block 20, connecting to one input terminal of the cross connect block 20 through connection 60a, and to one output terminal of the block 20 through connection 60b. In a manner similar to the previous embodiments, a connection 20b is made between the cross connect block 20 and splitter 50, with connection 20b attaching to block 20 at the same terminal that receives connection 60a. This places connection 60a in communication with connection 20b so that signals traveling through one will proceed to the other. A connection 40a between splitter 50 and the DSL system 40 is also established. In addition, a connection 50a, which carries the combined pair gain/DSL signal, is made between splitter 50 and the cross connect block 20. Similar to connection 20b, connection 50a is attached to block 20 at the same terminal that attaches to connection 60b, so that these two connections are placed in communication with one another.

Operation of the system illustrated in FIG. 7 will now be discussed. The pair gain signal is first transmitted to the protector field 12 via cable pair 10b. The signal enters the protector field 12 and gets passed on to the adapter 60, which shunts the signal to the cross connect block 20 over connection 60a. If cross connect block 20 is configured so that no DSL service is provided on the current subscriber line, the pair gain signal will simply pass from connection 60a, through the cross connect block 20, onto connection 60b, which brings the signal back to the adapter 60. The pair gain signal then passes through the protector module 14 and then back through the adapter 60 and the protector field 12 before being transmitted out to the subscriber over cable pair 12a.

Similar to the previous embodiments, a service technician can "turn on" DSL service for a subscriber by modifying the cross connect block 20 so as to disrupt the signal path running through the block 20. Upon the adapter 60 diverting the pair gain signal over to the cross connect block 20, the signal proceeds to be redirected over connection 20b into the splitter 50, whereupon the pair gain signal becomes combined with the DSL signal carried by connection 40a. The combined signal is then carried over connection 50a to the cross connect block 20, and over connection 60b back to the adapter 60. The combined signal is then passed through the protector module 14 and eventually redirected out upon the network to the subscriber.

Upon returning from the subscriber over cable pair 12a, the pair gain signal, and DSL signal, if present, are directed into the protector field 12 and passed through the adapter 60 on to the protector module 14, which removes any harmful over-voltages or over-currents. The pair gain signal, or pair gain/DSL combined signal, is then passed back through the adapter 60, which shunts the signal(s) over to the cross connect block 20. If DSL service is not being provided, the signal passes through block 20, is returned to adapter 60, and is subsequently directed out of the protector field 12 back to the pair gain system 10. If DSL service is being provided, the combined signal is directed over connection 20b to the splitter 50, which separates the two signals, directing the DSL signal back to the DSL system 40 while the pair gain signal is directed back to the adapter 60 and on to the pair gain system 10.

As in the previous embodiment illustrated in FIG. 5, the cross connect block 20 associated with adapter 60 is an insulation-displacement connection (IDC) cross connect block. Accordingly, to activate DSL service to a subscriber, a service technician only has to insert a disconnect plug 24 into the IDC block, thereby disrupting the signal path that previously allowed the signal from pair gain system 10 to "cut through" the cross connect block 20. As a result of the disruption caused by the disconnect plug 24, the signal is rerouted to splitter 50, thereby activating DSL service for a subscriber without providing any noticeable disruption in telephone service. To deactivate DSL service, the service technician simply removes the disconnect plug 24 from the cross connect block 20.

In the example illustrated in FIG. 7, protector field 12 is depicted as monitoring a single connection or cable pair, and thus requires a single adapter 60 to which attaches a single protector module 14. However, according to an additional embodiment of the invention, a protector field 12 can monitor a plurality of lines, and thus require a plurality of adapters 60 for shunting the one or more signals carried on each line to a cross connect block 20. For illustrative purposes, consider the following example, where one hundred cable pairs provide telephony service to one hundred subscribers. As such, the protector field 12 monitoring the one hundred cable pairs requires one hundred protector modules 14, each module 14 being associated with one cable pair. To "splice" in one or more cross connect blocks 20, one hundred adapters 60 are interfaced with the protector field 12, each adapter 60 plugging in to one of the receptacles traditionally reserved for a protector module 14. Each of the one hundred adapters 60 is subsequently also interfaced with one of the protector modules 14. In the above example, all one hundred adapters 60 connect to the same cross connect block 20 assuming that a sufficient number of input terminals is provided on the block 20. However, according to an alternative example, more than one cross connect block 20 can be present, with each block 20 connecting to only a limited number of the adapters 60 interfaced with the protector field 12.

Figure 8:
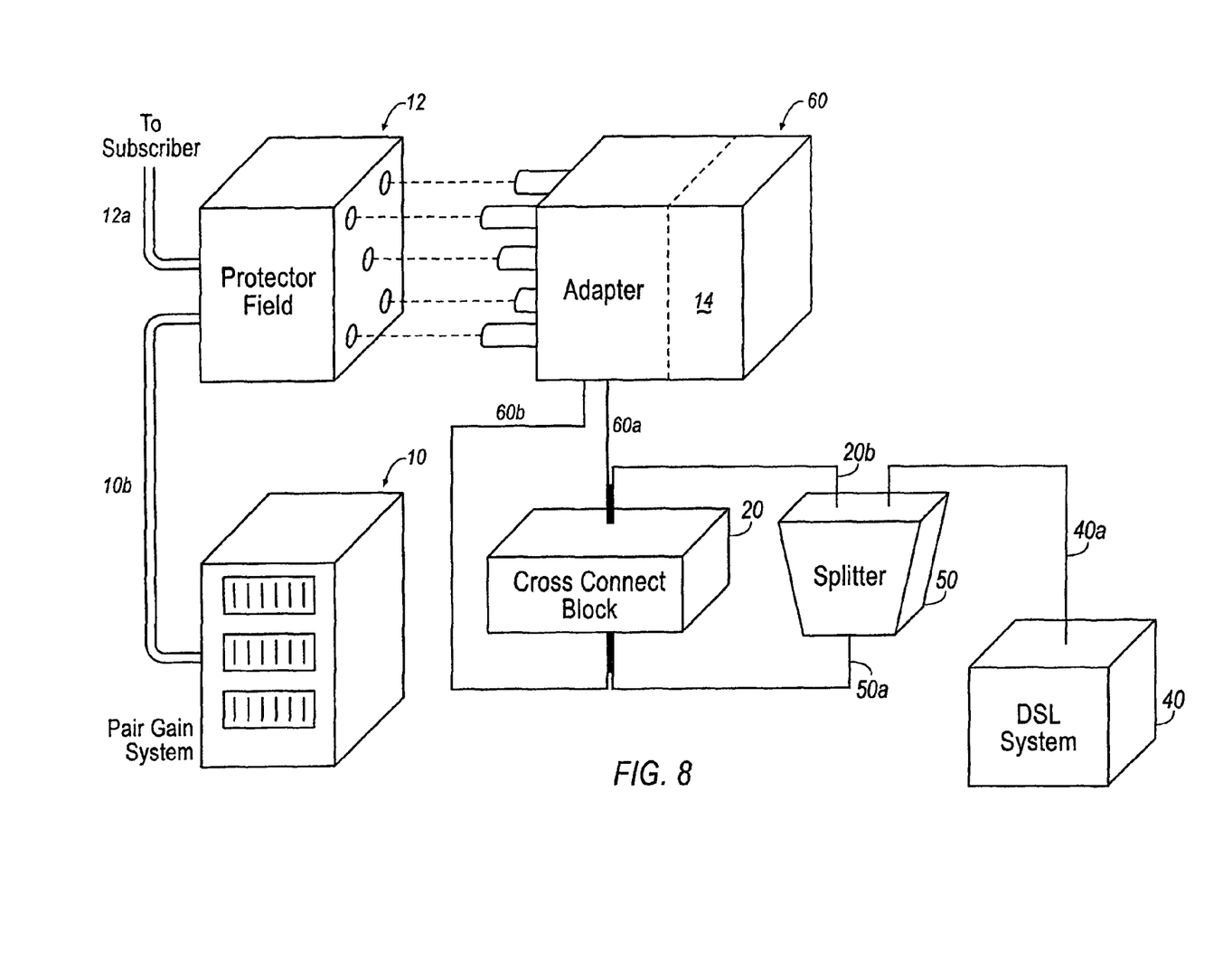
FIG. 8 is a simplified depiction of an alternative setup in accordance with an embodiment of the present invention for distributing telephonic communication service along with digital subscriber line data service to a subscriber.

In the above embodiments, adapter 60 interfaces with a protector field 12 and a protector module 14 in such a manner as to allow a cross connect block 20 to be easily "spliced" or inserted into the network. However, according to an alternative embodiment of the invention, an example of which is illustrated in FIG. 8, the adapter does not interface with a protector module 14, but instead incorporates the protector module 14 entirely as an integral subcomponent. Specifically, the adapter is configured to not only temporarily divert a signal over to a cross connect block 20, but also to provide the voltage and current monitoring function traditionally provided by the separate protector module 14. As a result, the present embodiment can be implemented within a telecommunications network by simply removing the traditional protector module 14 and replacing it with one of the "multi-function" adapters.

While the invention has been specifically described in connection with certain specific embodiments thereof, it is to be understood that this is by way of illustration and not of limitation, and the scope of the appended claims should be construed as broadly as the prior art will permit.

What is claimed is:

1. A telephone network system, comprising:
a) a pair gain system;
b) a digital subscriber line (DSL) system; and
c) an interface that protects against electrical abnormalities prior to relaying service from the telephone network system to a subscriber, the interface including:
  i) a protector field and a protector module;
  ii) an adapter electrically connected to both the protector field and the protector module; and
  iii) a cross connect block through which outgoing service signals pass, each outgoing service signal selectively being one of only a pair gain signal from the pair gain system and a combined signal, the combined signal including a pair gain signal from the pair gain system and a DSL signal from the DSL system;
  iv) wherein the pair gain signals from the pair gain system are routed by the adapter to the cross connect block, and wherein the outgoing service signals from the cross connect block are routed by the adapter to the protector module and then to the protector field.

2. The system of claim 1, wherein the protector module is a separate component from that of the adapter.

3. The system of claim 1, wherein the adapter directly interfaces with the protector field, and wherein the protector module indirectly interfaces with the protector field through the adapter.

4. The system of claim 1, wherein the cross connect block defines:

i) first signal routings for communicating the outgoing service signals to the adapter, the outgoing service signals of the first signal routings being the pair gain signals;

ii) second signal routings for communicating the outgoing service signals to the adapter, the outgoing service signals of the second signal routings being the combined signals; and iii) activation elements for selectively activating the second signal routings.

5. The system of claim 4, wherein no noticeable disruption of service occurs during the selective activation of the second signal routings.

6. The system of claim 4, wherein only one of the first and second routes are activated at one time.

7. The system of claim 4, wherein the first signal routing includes a first connection between the adapter and a first terminal on the cross connect block, and a second connection between a second terminal on the cross connect block and the adapter.

8. The system of claim 4, wherein the second signal routing includes the first connection between the adapter and the first terminal on the cross connect block, a third connection between the first terminal on the cross connect block and the splitter, a fourth connection between the splitter and the second terminal on the cross connect block, and the second connection between the second terminal on the cross connect block and the adapter.

9. The system of claim 4, wherein the activation elements disrupt the first signal routings so as to divert the pair gain signals to the DSL system.

10. The system of claim 1, wherein the cross connect block is an insulation displacement connection (IDC) block.

11. The system of claim 1, wherein the protector module is a 5-pin protector module that plugs into the adapter.

12. The system of claim 11, wherein the adapter is a 5-pin adapter that plugs into receptacles of the protector field normally occupied by the protector module.

* * * * *